(12) United States Patent
Gunell et al.

(10) Patent No.: US 10,598,194 B2
(45) Date of Patent: Mar. 24, 2020

(54) FLUID VALVE ASSEMBLY AND A PROCESS VALVE POSITIONER

(71) Applicant: METSO FLOW CONTROL OY, Vantaa (FI)

(72) Inventors: Jan Gunell, Söderkulla (FI); Kalle Vuorio, Helsinki (FI)

(73) Assignee: METSO FLOW CONTROL OY, Vantaa (FI)

( * ) Notice: Subject to any disclaimer, the term of this patent is extended or adjusted under 35 U.S.C. 154(b) by 63 days.

(21) Appl. No.: 15/556,141

(22) PCT Filed: Mar. 15, 2016

(86) PCT No.: PCT/FI2016/050159
§ 371 (c)(1),
(2) Date: Sep. 6, 2017

(87) PCT Pub. No.: WO2016/146890
PCT Pub. Date: Sep. 22, 2016

(65) Prior Publication Data
US 2018/0045227 A1 Feb. 15, 2018

(30) Foreign Application Priority Data
Mar. 16, 2015 (FI) .................................. 20155177

(51) Int. Cl.
*F16K 11/04* (2006.01)
*F16K 31/126* (2006.01)
(Continued)

(52) U.S. Cl.
CPC .......... *F15B 13/0426* (2013.01); *F15B 5/006* (2013.01); *F15B 13/0433* (2013.01);
(Continued)

(58) Field of Classification Search
CPC ..... Y10T 137/86582; Y10T 137/86678; Y10T 137/86686; Y10T 137/8671; F16K 11/044;
(Continued)

(56) References Cited

U.S. PATENT DOCUMENTS 2,866,476 A 12/1958 Orloff
3,415,284 A 12/1968 Stampfli
(Continued)

FOREIGN PATENT DOCUMENTS

CN 1129480 A 8/1996
DE 4214661 A1 11/1993
(Continued)

OTHER PUBLICATIONS

Oct. 23, 2018 Office Action issued in Chinese Patent Application No. 201680016427.8.
(Continued)

*Primary Examiner* — Kevin F Murphy
*Assistant Examiner* — Kelsey E Cary
(74) *Attorney, Agent, or Firm* — Oliff PLC

(57) ABSTRACT

A fluid valve assembly for controlling a single-acting or double-acting actuator comprises a valve body having a central bore with at least one supply port for receiving a supply of fluid under pressure, at least one actuator port (C1,C2) for providing a control fluid pressure to an actuator, and at least one exhaust port (EX1,EX2). At least one pair of counter-acting metering edges operationally tied together by a stem movable within central bore in an axial direction a pilot force. Each metering edge of each counter-acting pair comprises a mating seat surface (PS1,PS2,PS3,PS4) on the valve body or the stem, and a poppet ring (PR1,PR2, PR3,PR4) supported by a flexible element (SD1,SD2,SD3, SD4) to the valve body or the stem in a manner allowing a (Continued)

relative axial movement of the poppet ring and the supporting valve body or stem also in a closed state of the respective metering edge.

17 Claims, 9 Drawing Sheets

(51) Int. Cl.
- F15B 13/042 (2006.01)
- F16K 11/044 (2006.01)
- F16K 11/048 (2006.01)
- F15B 13/043 (2006.01)
- F15B 5/00 (2006.01)
- F15B 13/04 (2006.01)

(52) U.S. Cl.
CPC .......... *F16K 11/044* (2013.01); *F16K 11/048* (2013.01); *F16K 31/126* (2013.01); *F16K 31/1262* (2013.01); *F15B 13/0405* (2013.01); *F15B 2211/634* (2013.01); *F15B 2211/6309* (2013.01); *F15B 2211/6313* (2013.01); *F15B 2211/6336* (2013.01); *F15B 2211/7054* (2013.01)

(58) Field of Classification Search
CPC .. F16K 11/048; F16K 31/126; F16K 31/1262; F16K 11/022; F16K 11/027; F16K 31/1266; F16K 31/1268; F15B 13/0426; F15B 13/042
USPC .............. 137/625.6, 625.26, 625.27, 625.69
See application file for complete search history.

(56) References Cited

U.S. PATENT DOCUMENTS

| | | | |
|---|---|---|---|
| 3,424,057 A | 1/1969 | Schweizer | |
| 3,646,969 A | 3/1972 | Stampfli | |
| 3,785,392 A | 1/1974 | Baker | |
| 3,868,969 A | 3/1975 | Schwenk | |
| 4,219,181 A | 8/1980 | Joelson | |
| 4,316,599 A | 2/1982 | Bouvet et al. | |
| 4,445,333 A | 5/1984 | Coleman | |
| 4,574,844 A | 3/1986 | Neff et al. | |
| 5,014,747 A | 5/1991 | Suzuki et al. | |
| 5,042,832 A | 8/1991 | Takahashi et al. | |
| 5,174,338 A | 12/1992 | Yokota et al. | |
| 5,261,455 A | 11/1993 | Takahashi et al. | |
| 5,261,458 A | 11/1993 | Johnson et al. | |
| 5,372,196 A | 12/1994 | Andersson | |
| 5,562,125 A | 10/1996 | Bray | |
| 5,899,231 A | 5/1999 | Drori | |
| 5,913,577 A | 6/1999 | Amdt | |
| 6,237,635 B1 | 5/2001 | Nambu | |
| 6,276,385 B1 | 8/2001 | Gassman | |
| 6,957,127 B1 | 10/2005 | Smart et al. | |
| 7,458,310 B2 | 12/2008 | Junk | |
| 8,522,818 B2 | 9/2013 | Tondolo | |
| 2008/0169439 A1 | 7/2008 | Waterstredt et al. | |

FOREIGN PATENT DOCUMENTS

| | | | |
|---|---|---|---|
| FI | 20155177 A | 9/2016 | |
| FR | 2303217 A1 | 10/1976 | |
| GB | 1153456 A | 5/1969 | |
| GB | 2154707 A | 9/1985 | |
| JP | S49-43619 B1 | 11/1974 | |
| JP | S52-029582 A | 3/1977 | |
| JP | S52-31930 U | 3/1977 | |
| JP | H04-266676 A | 9/1992 | |
| JP | H09-236186 A | 9/1997 | |
| JP | H10-288273 A | 10/1998 | |
| JP | 2002-081557 A | 3/2002 | |
| JP | 2002-243059 A | 8/2002 | |
| WO | 2014/080664 A1 | 5/2014 | |
| WO | 2016/146890 A1 | 9/2016 | |

OTHER PUBLICATIONS

May 10, 2016 International Search Report issued in International Patent Application No. PCT/FI2016/050159.
May 10, 2016 Written Opinion issued in International Patent Application No. PCT/FI2016/050159.
Oct. 2, 2015 Search Report issued in Finnish Patent Application No. 20155177.
Apr. 24, 2018 Search Report issued in Finnish Patent Application No. 20165267.
Oct. 21, 2016 Search Report issued in Finnish Patent Application No. 20165267.
Jun. 21, 2017 International Search Report issued in International Patent Application No. PCT/FI2017/050219.
Jul. 19, 2018 International Preliminary Report on Patentability issued in International Patent Application No. PCT/FI2017/050219.
Sep. 4, 2018 Office Action issued in Japanese Patent Application No. 2017-548429.
Mar. 1, 2018 Extended Search Report issued in European Patent Application No. 16 764 286.7.
Mar. 14, 2019 Extended European Search Report issued in European Patent Application No. 17773367.2.
Oct. 1, 2019 Office Action issued in Japanese Patent Application No. 2018-551436.

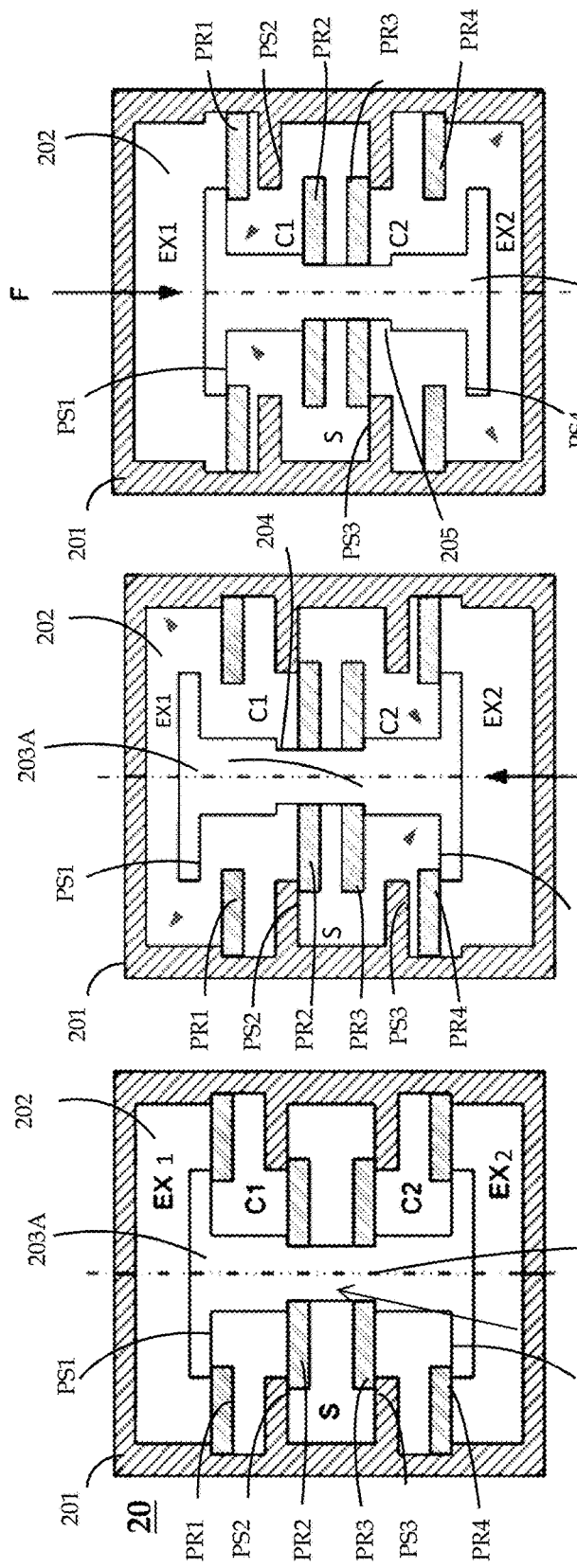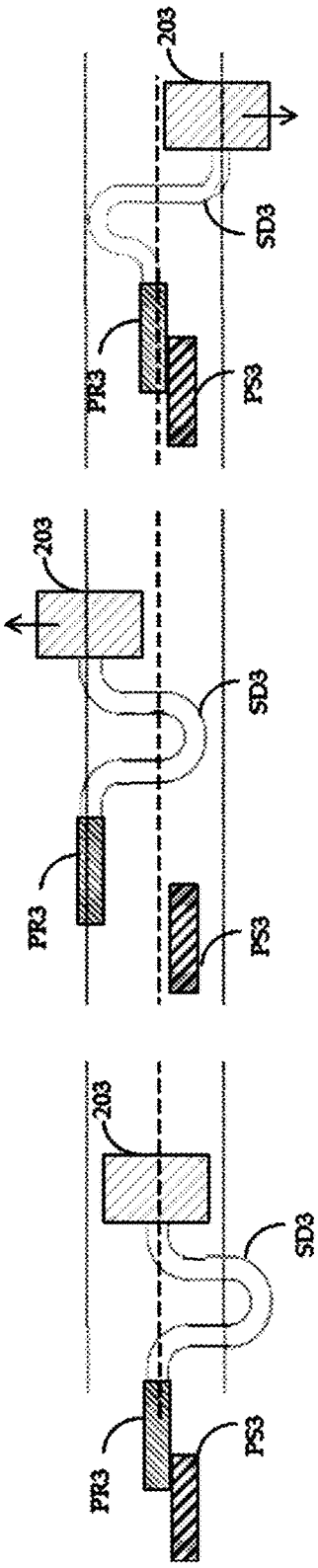

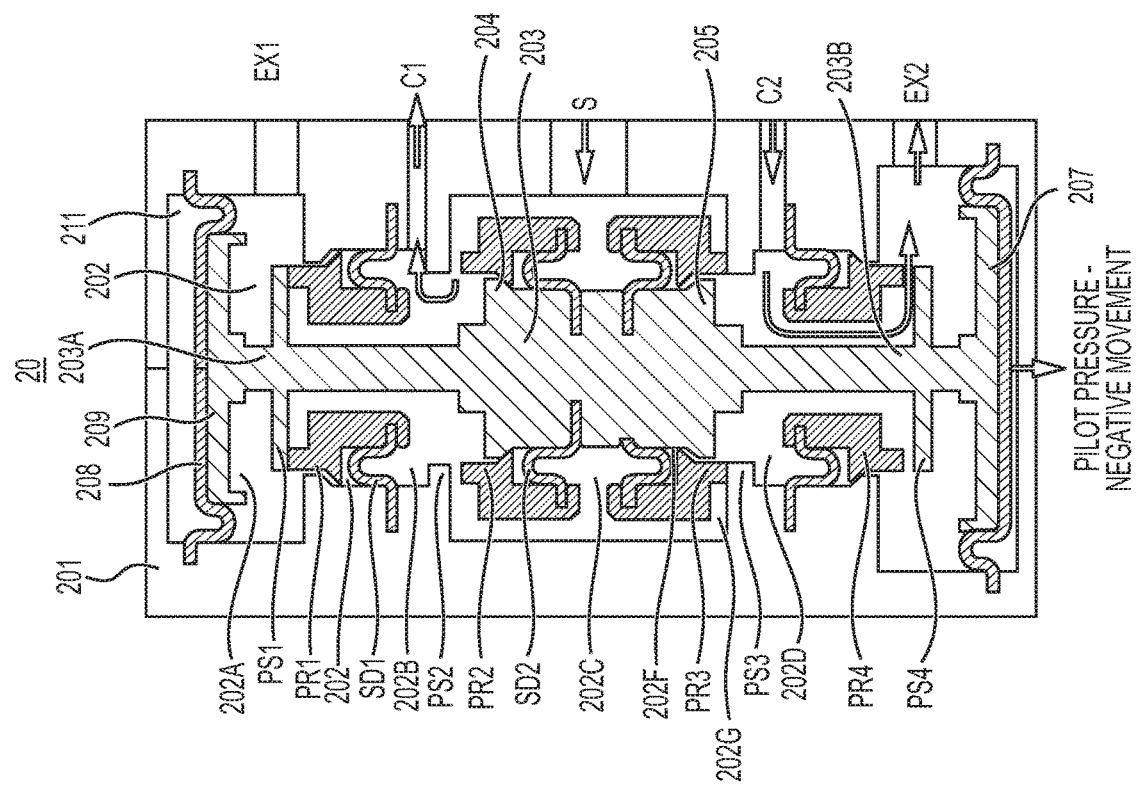
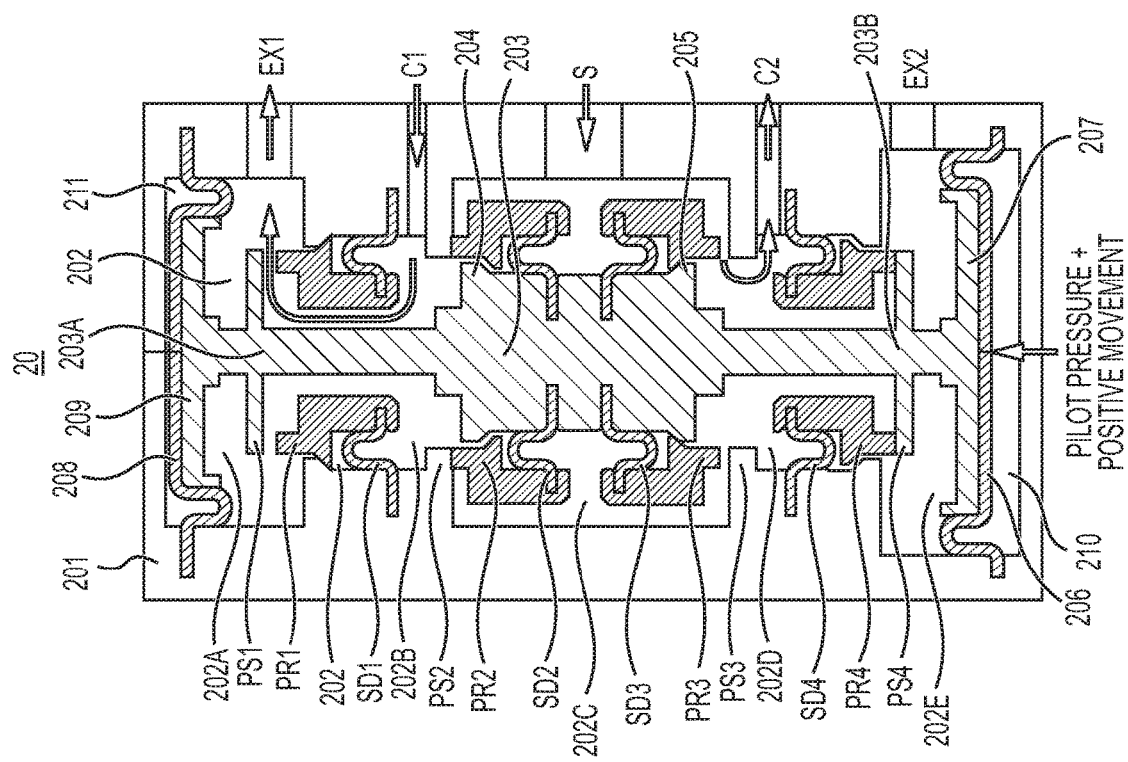

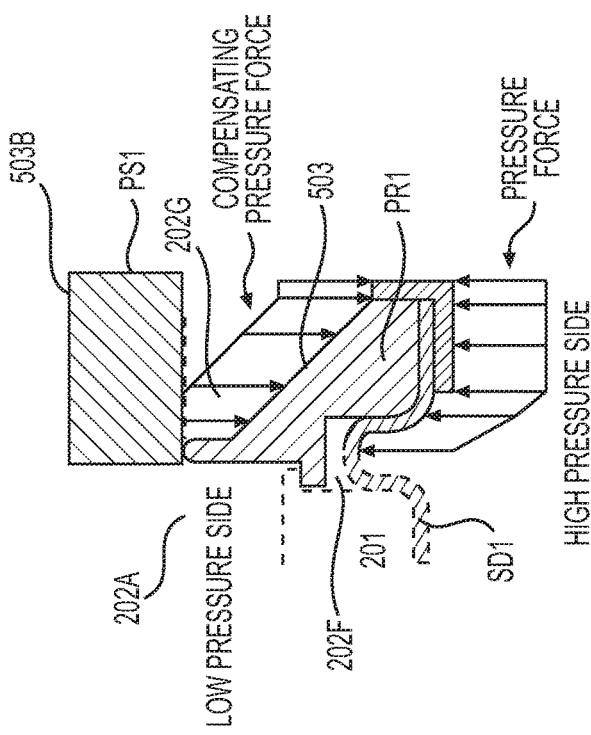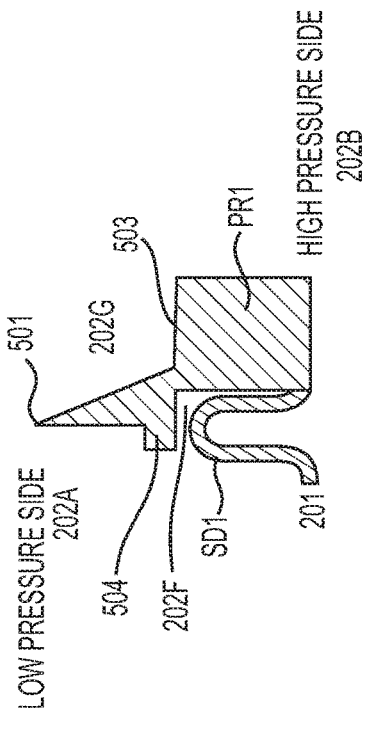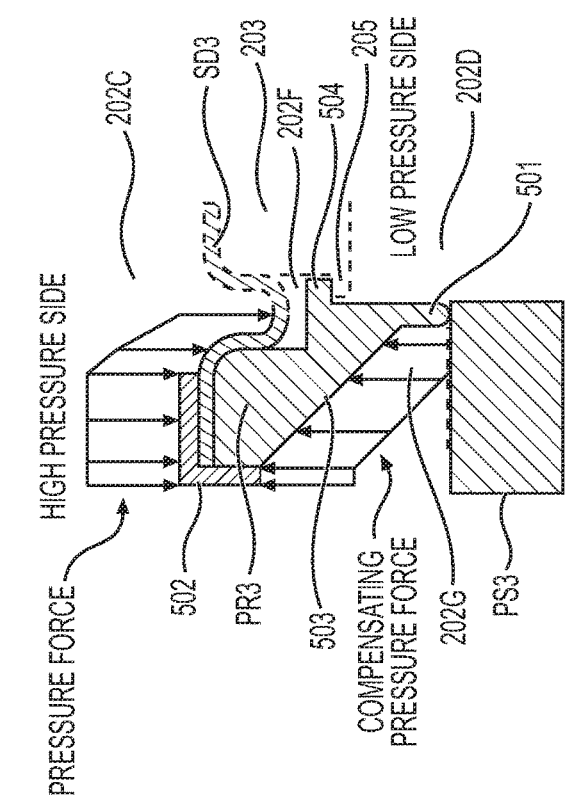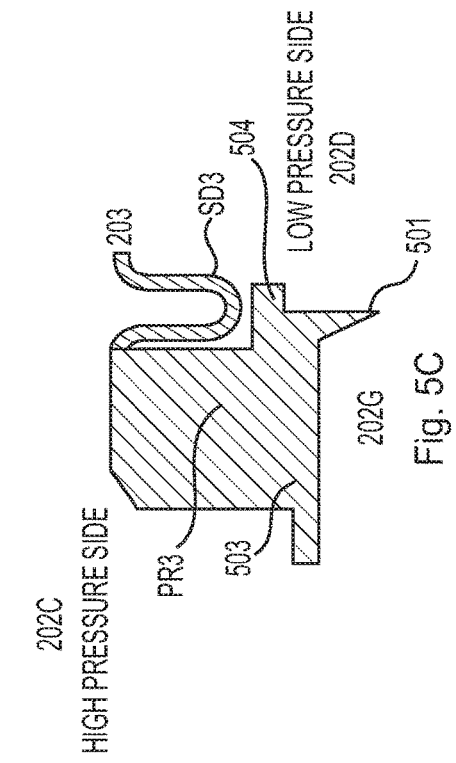

FLUID VALVE ASSEMBLY AND A PROCESS VALVE POSITIONER

FIELD OF THE INVENTION

The invention relates to controlling fluid actuators, particularly pneumatic and hydraulic actuators.

BACKGROUND OF THE INVENTION

Actuators are frequently used as mechanisms to introduce motion or control motion. It is operated by a source of energy, typically electric current, hydraulic fluid pressure, or pneumatic fluid pressure, and converts that energy into motion of a target mechanism, such as into movement of a closure element of a control valve.

A control valve is generally used for a continuous control of a liquid or gas flow in different pipelines and processes. In a processing industry, such as pulp and paper, oil refining, petrochemical and chemical industries, different kinds of control valves installed in a plant's pipe system control material flows in the process. A material flow may contain any fluid material, such as fluids, liquors, liquids, gases and steam. The control valve is usually connected with an actuator, which moves the closing element of the valve to a desired position between fully open and fully closed positions. The actuator may be a pneumatic cylinder-piston device, for example. The actuator, for its part, is usually controlled by a valve positioner, also called as a valve controller, which controls the position of the closing element of the control valve and thus the material flow in the process according to a control signal from the process controller.

Valves generally applied in the industry are often operated by means of pneumatic actuators. These actuators convert a pneumatic into valve stem motion by pressure acting on a diaphragm or piston connected to the stem. The actuators can be either single-acting or double-acting. With the single-acting devices, movement in the opposite direction is effected by a spring, compressed air working against the spring. When air pressure closes the valve and spring action opens the valve, the actuator is termed direct acting. When air pressure opens the valve and spring action closes the valve, the actuator is termed reverse acting. Double-acting actuators have air supplied to both sides of the diaphragm or the piston. The differential pressure across the diaphragm or the piston positions the valve stem. Automatic operation is provided when the pneumatic signals are automatically controlled by circuitry. Semi-automatic operation is provided by manual switches in the circuitry to the air control valves. Also hydraulic actuators may be employed for positioning of the valve similar to the pneumatic actuators, but now a hydraulic fluid is used instead of air or a pneumatic fluid.

A valve positioner can typically receive control commands over a digital fieldbus or as an analog 4 . . . 20 mA control signal. Highway Addressable Remote Transducer (HART) protocols allow transmission of digital data together with a conventional 4 to 20 mA analog signal. Other examples of fieldbuses are Fieldbus and Profibus. Typically all electric power to a positioner is taken from the fieldbus or the 4 . . . 20 mA control signal. A separate electric power supply to a positioner is not desired, because this would require a separate cabling. A positioner may include an electronic unit having an electrical control output and a pneumatic or hydraulic unit that takes in the electrical control signal and converts it to a corresponding fluid pressure output to an actuator. This is often referred to as a current-to-pressure (I/P) conversion. The pneumatic or hydraulic unit may comprise a prestage and an output stage. Because the electric power available from the fieldbus or analog current loop is very limited, the prestage may first convert the electrical control signal into a small pilot fluid pressure which is sufficient to control the output stage. The output stage is connected to a supply fluid pressure and amplifies the small pilot pressure signal into a larger fluid pressure output signal used by the actuator. The output stage is often referred to as a pressure amplifier, a pressure booster, or a pressure relay.

Pneumatic output stages used in positioners can coarsely be grouped into spool valve assemblies and poppet valve assemblies. A simplified design example of a 5/3 spool valve (5 ports/3 states) for controlling a double-action actuator is illustrated in FIG. 1A and the corresponding schematic symbol FIG. 1B. In an output stage of a spool valve type the only moving part is a spool 6 which moves within a central bore in a valve body 7 and controls an air flow from a supply pressure port 1 to the actuator ports 2, 4, and from the actuator ports 2,4 to exhaust ports 3 and 5. Due to the structure of the spool valve, there is always a supply air leakage through the valve. The strict tolerances make manufacturing techniques of spool valves very demanding. Generally, the output stage of a spool valve type is not robust to changes in operating environment and in manufacturing.

An output stage with a poppet valve design has got higher number of moving parts than a spool valve. However, the larger tolerances and clearances allowed for the spool valve parts make it possible to utilize an economical mass production and modern manufacturing techniques. A simplified design example of a conventional 4/2 poppet valve (4 ports/2 states) for controlling a double-action actuator is illustrated in FIG. 1C and the corresponding schematic symbol in FIG. 1 D. As can be seen, in a conventional poppet valve assembly two separate poppet valves 8 and 9 are required to control an air flow from a supply pressure port 1 to the actuator ports 2,4, and from the actuator ports 2,4 to the exhaust port 3. In the conventional output stage illustrated in FIG. 1C the controllability with a single pilot pressure is poor, since the movements of the poppet valves 8 and 9 are not mechanically connected to each other. U.S. Pat. No. 6,276,385 discloses an output stage wherein the movement of poppet valves are together by an actuation beam to move in unison, but in opposing directions. The actuation beam is a rocker arm rotating upon a central pivot. The movement of poppet valves is now synchronized.

Both in the conventional output stage illustrated in FIG. 1C and in the output stage of U.S. Pat. No. 6,276,385 the control of the poppet valves requires very large forces to overcome the pressure forces. The threshold force required to open a poppet valve becomes large and introduces a significant point of discontinuation within the control region. This characteristic of prior art output stages of poppet valve type makes the control of the output stage significantly more difficult.

Examples of 3/2 output stages (3 ports/2 states) of poppet valve type for a single-action actuator are disclosed in U.S. Pat. Nos. 6,276,385, 6,957,127, 8,522,818, 7,458,310, and 5,261,458.

BRIEF DESCRIPTION OF THE INVENTION

An aspect of the present invention is to provide a fluid valve assembly or an output stage with poppet valve design.

An aspect of the invention is a fluid valve assembly and a valve positioner as defined in the independent claims. Embodiments of the invention are disclosed in the dependent claims.

An aspect of the invention is a fluid valve assembly for connection to a supply of fluid under pressure for providing an actuator, particularly a hydraulic or pneumatic actuator, with a actuator fluid pressure, comprising:

a valve body having a central bore with at least one supply port for receiving a supply of fluid under pressure, at least one actuator port for providing a control fluid pressure to an actuator, and at least one exhaust port;

a stem movable within said central bore in an axial direction by the pilot force;

at least one pair of counter-acting metering edges operationally tied together by the stem, each metering edge of each counter-acting pair comprising a mating seat surface on the valve body or the stem and a poppet ring supported by a flexible element to the valve body or the stem in a manner allowing a relative axial movement of the poppet ring and the supporting valve body or stem also in a closed state of the respective metering edge.

In an embodiment, the at least one pair of counter-acting metering edges are mechanically tied together by the stem such that both metering edges of each counter-acting pair are closed in an intermediate position of the stem, one metering edge is closed and the other metering edge of each counter-acting pair is opened with the movement of the stem to a first axial position, and the one metering edge is opened and the other metering edge of each counter-acting pair is closed with the movement of the stem to an opposite second axial position.

In an embodiment, one metering edge of each counter-acting pair is arranged to control fluid flow between a respective actuator port and the supply of fluid, and the other control edge of each counter-acting pair is arranged to control fluid flow between the respective actuator port and an exhaust port.

In an embodiment, one control edge of each counter-acting pair comprises the poppet ring supported by the flexible element to the stem and the respective mating seat surface on the valve body, and the other control edge of each counter-acting pair comprises a poppet ring supported by the flexible element to the valve body and the respective mating seat surface on the stem.

In an embodiment, the poppet rings arranged coaxially with the stem, and the flexible element of each poppet ring comprises a respective annular sealing element, preferably an annular sealing diaphragm or an annular sealing bellows.

In an embodiment, in one control edge of each counter-acting pair the poppet ring is supported at its inner circle by the respective annular flexible sealing element to an outer circle of the stem, and in the other control edge of each counter-acting pair the poppet ring is supported at its outer circle by the respective annular flexible sealing element to the valve body.

In an embodiment, each poppet ring is pressure-balanced to approximately compensate fluid pressure forces exerted on the respective poppet ring.

In an embodiment, the at least one pair of counter-acting metering edges comprises one pair of counter-acting metering edges for each actuator port of the fluid valve assembly, the actuator port being preferably located between the counter-acting metering edges of the respective pair.

In an embodiment, the at least one actuator port comprises a first actuator port and a second actuator port, and the at least one pair of counter-acting comprises a first pair of counter-acting first and second metering edges for the first actuator port, and a second pair of counter-acting third and fourth metering edges for the second actuator.

In an embodiment, the first actuator port is located between the first metering edge and the second metering edge of the first counter-acting pair, and the second actuator port is located between the third metering edge and the fourth metering edge of the second counter-acting pair.

In an embodiment, the first metering edge comprising a first poppet ring arranged coaxially around the stem within said central bore and fixed to the valve body by a first flexible sealing element member allowing a movement of the first poppet ring in the axial direction, the first poppet ring cooperating with a first mating seat surface on the stem to controlling fluid flow between the first actuator port and one of the supply and exhaust ports;

the second metering edge comprises a second poppet ring arranged coaxially around the stem within said central bore and connected to the stem device by a second flexible sealing member allowing a movement of the second poppet ring in the axial direction, the second poppet ring cooperating with a second mating seat surface on the valve body to control fluid flow between the actuator port and the other of the supply and exhaust ports; the third metering edge comprises a third poppet ring arranged coaxially around the stem within said central bore and fixed to the stem by a third flexible sealing element member allowing a movement of the third poppet ring in the axial direction, the third poppet ring cooperating with a third mating seat surface on the valve body to controlling fluid flow between the second actuator port and one of the supply and exhaust ports; and the fourth metering edge comprises a fourth poppet ring arranged coaxially around the stem within said central bore and connected to the valve body device by a fourth flexible sealing member allowing a movement of the fourth poppet ring in the axial direction, the fourth poppet ring cooperating with a fourth mating seat surface on the stem to control fluid flow between the second actuator port and the other of the supply and exhaust ports.

In an embodiment, the at least one supply port comprises a common supply port located at a middle section of the central bore defined between the second and third pairs of metering edges, and the at least one exhaust port comprises a first exhaust port located at a first end section of the central bore defined between the first metering edge and a first end of the central bore, and a second exhaust port located at an opposite second end section of the central bore defined between the fourth metering edge and an opposite second end of the central bore.

An embodiment comprises means for providing an axial pilot force affecting on one end of the stem and means for providing an axial counter force affecting on the opposite end of the stem.

An embodiment comprises a pilot diaphragm and a piston arranged at one end of the stem to provide the axial pilot force which depends on a pilot fluid pressure.

An embodiment comprises a counter diaphragm and a counter piston arranged at one end of the stem to provide an axial counter force opposite to the axial pilot force according to a counter fluid pressure affecting on the counter diaphragm.

In an embodiment, the counter diagram is arranged to scale the axial counter force from the supply fluid force affecting on the counter diaphragm.

In an embodiment, the counter diaphragm comprises the sealing diaphragm of one of control edges.

In an embodiment, all metering edges are aligned in the axial direction.

In an embodiment, said means for providing the axial pilot force comprises a said means for providing a pilot diaphragm and a piston arranged at the other end of the stem to provide the axial pilot force which depends on a pilot fluid pressure in the pilot pressure chamber, and a further restricted flow path from a supply pressure inlet of the valve assembly to a prestage which controls the pilot pressure in the pilot pressure chamber and thereby the axial pilot force, and said means for providing the axial counter force comprises a counter diaphragm and a counter piston arranged at one end of the stem to provide an axial counter force according to a counter pressure affecting on the counter diaphragm in the counter pressure chamber, and a further restricted flow path from a supply pressure inlet of the valve assembly to the counter pressure chamber.

In an embodiment, the restricted flow path and the further restricted flow path are dimensioned so that a rate of change of the axial counter force and the rate of change of the pilot force due to a change in the supply pressure in the supply pressure inlet are approximately equal.

In an embodiment, the restricted flow path and/or the further restricted flow path comprises a flow restrictor, such a flow orifice restrictor, preferably with an orifice diameter of from about 0.1 mm to about 0.5 mm, more preferably from about 0.2 mm to about 0.3 mm.

Another aspect of the invention is a process valve positioner comprising an electronic unit having an electrical control output and a pneumatic or hydraulic unit arranged to convert the electrical control output to a corresponding fluid pressure output to an actuator, said fluid unit comprising a fluid valve assembly according to embodiments of the invention.

In an embodiment, the pneumatic or hydraulic unit comprises a prestage and an output stage, the prestage being arranged to convert the electrical control output into a pilot fluid pressure which is sufficient to control the output stage, the output stage comprising a fluid valve assembly according to embodiments of the invention.

In an embodiment, the pneumatic or hydraulic unit comprises a further prestage arranged to convert an electrical control output into a counter fluid pressure.

Still another aspect of the invention is a use of a fluid valve assembly according to embodiments of the invention in controlling of a process valve.

BRIEF DESCRIPTION OF THE DRAWINGS

In the following, the invention will be described by means of exemplary embodiments with reference to the attached drawings, in which

FIGS. 2A, 2B and 2C illustrate schematically a fluid valve assembly according to exemplary embodiments of the invention in three positions of the stem;

FIGS. 3A and 3B illustrate schematically a fluid valve assembly according to further exemplary embodiments in two positions of the stem.

FIGS. 4A, 4B and 4C illustrate schematically an example of the flexible support of a poppet ring to the stem in three positions of the stem;

FIGS. 5A, 5B, 5C and 5D illustrate schematically examples of pressure-balanced poppet rings according to embodiments of the invention;

EXAMPLE EMBODIMENTS OF THE INVENTION

Figure 1B:
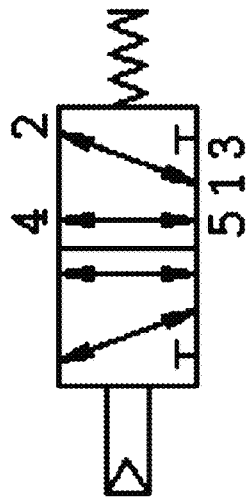
FIGS. 1A and 1B illustrate a simplified example of a prior art 5/3 spool valve and the corresponding schematic symbol, respectively.
Figure 1D:
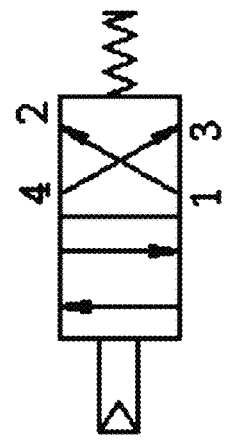
FIGS. 1C and 1D illustrate a simplified example of a prior art 4/2 poppet valve and the corresponding schematic symbol, respectively.
Figure 1A:
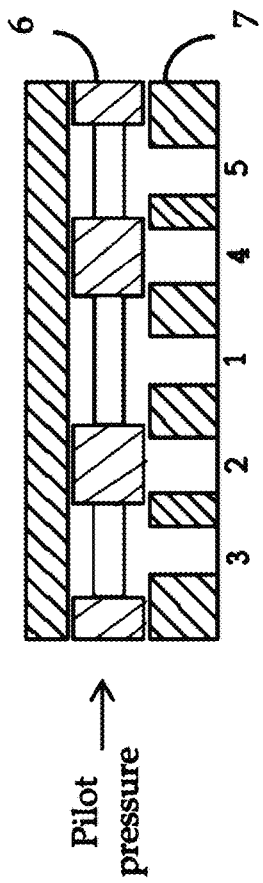

In FIGS. 2A, 2B and 2C, a fluid valve assembly 20 which can be connected to a supply of fluid under pressure for providing an actuator with a control fluid pressure, according to an exemplary embodiment of the invention is illustrated schematically.

In FIGS. 3A and 3B, a fluid valve assembly 20 according to further exemplary embodiments is illustrated schematically in more detail. Same reference symbols in FIGS. 2A, 2B, 2C, 3A and 3B refer to the same or corresponding elements, structures, functionalities and features.

In the exemplary embodiments, the valve assembly is a 5/3 valve with five ports and three positions or states for controlling a double-acting actuator or a corresponding device. However, same principles can be applied also to valve assemblies with other number of ports and/or positions or states.

The valve assembly 20 comprises an elongated frame or body 201 having an axial central bore or chamber 202 with a supply port S for receiving a supply of fluid under pressure, a first actuator port C1 for providing a first control fluid pressure to a double-acting actuator, a first exhaust port EX1 for venting (e.g. to environment) the fluid pressure from the actuator port C1, a second actuator port C2 for providing a second control fluid pressure to the double-acting actuator, and a second exhaust port EX2 for venting (e.g. to environment) the fluid pressure from the actuator port C2.

According to an aspect of the invention a stem 203 is provided within the valve body 201 to move in an axial direction in the central bore 202. The stem 203 may comprise two or more parts arranged to form a single rigid stem when installed in the valve assembly. The stem 203 extends through a plurality of poppet rings PR1, PR2, PR3 and PR4 arranged at axially spaced locations within the central bore 202. Each poppet ring PR1, PR2, PR3 and PR4 is arranged coaxially with the stem 203 to cooperate with a respective mating seat surface PS1, PS2, PS3 and PS4 to form a respective metering edge (which may be alternatively called a control edge) PR1/PS1, PR2/PS2, PR3/PS3 and PR4/PS4 forming control orifices (illustrated by arrows in FIGS. 2B, 2C) for controlling fluid flow between a respective actuator port C1, C2 and one of the supply and exhaust ports. In a closed position of a metering edge, when a poppet ring is pressed against a respective mating seat surface, there is substantially no fluid flow through the metering edge. It should be appreciated that some fluid flow or fluid leakage may be allowed in some embodiments although the metering edge is considered to be closed. In an open position of a metering edge, when a poppet ring is separated from a respective mating seat surface and an orifice is opened between them, a fluid flow through the metering edge is allowed.

Figure 1C:
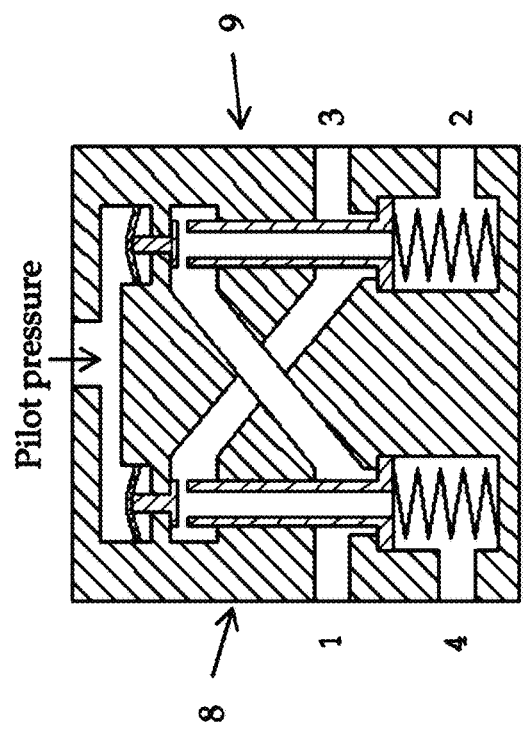

According to an aspect of the invention, metering edges PR1/PS1, PR2/PS2, PR3/PS3 and PR4/PS4 of the valve assembly 20 are mechanically tied together by the stem 203 and supported by flexible elements SD1, SD2, SD3 and SD4. The axial relative movement of the metering edges and the stem 203 or the body 201 is allowed in the closing direction also upon they have reached their closed positions. In a conventional poppet valve, when the valve is closed, the movement of the poppet cannot be continued in the closing direction. This enables an accurate control of a 5/3 poppet valve with one pilot force, such as with one pilot pressure. This is not possible in the prior art poppet structure shown in FIG. 1C. In the prior poppet structure disclosed in U.S. Pat. No. 6,276,385, the mechanical connection between the poppet valves is implemented with a rocker arm.

According to an aspect of the invention, a pair of counter-acting metering edges is provided for each of the actuator ports C1 and C2 such that both metering edges of the counter-acting pair are closed in a centre position of the stem, one metering edge is closed and the other metering edge of the counter-acting pair is opened with the movement of the stem 203 to a first axial direction, and the one metering edge is opened and the other metering edge of the counter-acting pair is closed with the movement of the stem 203 to an opposite second axial direction.

A poppet-type valve assembly can, unlike a spool valve, be made practically leak-free without using soft sealings which are prone to wearing. The manufacturing technique required is not as demanding as that of a small-clearance spool valve. Despite of the higher number of components, the manufacturing costs are competitive.

In an embodiment, each poppet ring PR1, PR2, PR3 and PR4 arranged coaxially with the stem 203 is supported by a respective flexible element SD1, SD2, SD3 and SD4 to the body 201 or the stem 203 so that the axial relative movement of the poppet rings PR1, PR2, PR3 and PR4 and the stem 203 or the body 201 in the closing direction is allowed also upon the poppet rings have reached their closed positions.

In an embodiment, the flexible element SD1, SD2, SD3 and SD4 is an annular sealing diaphragm or an annular sealing bellows, such as illustrated in the examples of FIGS. 3A and 3B, and FIGS. 4A, 4B and 4C.

In an embodiment, each poppet ring PR1, PR2, PR3 and has a respective mating seat surface PS1, PS2, PS3 and PS4 formed by a larger diameter section of the stem 203, such as shoulder or flange, or formed by a body section protruding radially into the central bore 202 thereby providing a smaller diameter section of the central bore 202, such as an inward shoulder or flange of the body 201.

In an embodiment of the invention, the poppet rings PR1 and PR4 are supported to the valve body 201 by respective flexible elements SD1 and SD4 at their outer circles, while their inner circles are free. The poppet rings PR1 and PR4 may protrude radially inwards to the central bore 202 and have respective mating seat surfaces PS1 and PS4 formed by respective larger diameter end sections 203A and 203B of the stem 203. The poppet rings PR2 and PR3 are supported to the stem 203 by respective flexible elements SD2 and SD3 at their inner circles, while their outer circles are free. The poppet rings PR2 and PR3 have respective mating seat surfaces PS2 and PS3 formed on the valve body 201.

According to an aspect of the invention, a pair of counter-acting metering edges is provided for each of the actuator ports C1 and C2 such that both metering edges of the counter-acting pair are closed in a centre position of the stem, one metering edge is closed and the other metering edge of the counter-acting pair is opened with the movement of the stem 203 to a first axial direction, and the one metering edge is opened and the other metering edge of the counter-acting pair is closed with the movement of the stem 203 to an opposite second axial direction.

In an embodiment, a first pair of counter-acting metering edges for the first actuator port C1 comprises the first metering edge PR1/PS1 and a second metering edge PR2/PS2. A second pair of counter-acting metering edges for the second actuator port C2 comprises the third metering edge PR3/PS3 and the fourth metering edge PR4/PS4.

In an embodiment, the first metering edge PR1/PS1 controls the fluid flow between the first actuator port C1 and the first exhaust port EX1, the second metering edge PR2/PS2 controls the fluid flow between the first actuator port C1 and the supply port S, the third metering edge PR3/PS3 controls the fluid flow between the second actuator port C2 and the supply port S, and the fourth metering edge PR4/PS4 controls the fluid flow between the second actuator port C2 and the second exhaust port EX2

In an embodiment, the first actuator port C1 is located at the section (or chamber) 202B of the central bore 202 defined between the first and second pairs of metering edges PR1/PS1 and PR2/PS2, and the second actuator port C2 is located at the section (or chamber) 202D of the central bore 202 defined between the third and fourth pairs of metering edges PR3/PS4.

In an embodiment, the supply port S is located at the middle section (or chamber) 202C of the central bore 202 defined between the second and third pairs of metering edges PR2/PS2 and PR3/PS3. The first exhaust port EX1 is located at the end section (or chamber) 202A of the central bore 202 defined between the first metering edge PR1/PS1 and one end of the central bore 202, and the second exhaust port EX2 is located at the opposite end section (chamber) 202E of the central bore 202 defined between the fourth metering edge PR4/PS4 and the opposite end of the central bore 202. This is an effective configuration from the size and manufacturing point of view. However, different configurations may be used. For example, in an alternative embodiment the supply port S may be configured to be an exhaust port and the exhaust ports EX1 and EX2 may be configured to be supply ports S1 and S2. As further example, the single supply port S may be replaced by two separate supply ports S1 and S2.

In alternative embodiments, all poppet rings may be supported by respective flexible sealing elements to the stem 202, in a similar manner as poppet rings PR2 and PR2, and all mating seat surfaces may be arranged on the valve body 201, in a similar manner as mating seat surfaces PS2 and PS3. In further alternative embodiments, all poppet rings may be supported by respective flexible sealing elements to the valve body 201, in a similar manner as poppet rings PR1 and PR4, and all mating seat surfaces may be arranged on the stem 203, in a similar manner as mating seat surfaces PS1 and PS4. However, in this case some of the poppets rings would not be on the higher pressure side of the respective metering edge which may cause problems in a flow control and in a pressure-balancing.

In an embodiment, pre-loaded elastic elements, such as springs, are provided to make the closing forces for the metering edges. For example there may be one or more pre-loaded springs around the stem 203 in the central bore 202 at the actuator port C1 to abut the poppet ring PR1 at other end and to abut a suitable support element, such as a shoulder, on the body 201 or the stem 203 at the other end. Thereby an axial closing force is exerted on the poppet ring PR1 to press it against the mating seat surface PS1. Similarly, there may be one or more pre-loaded springs around the stem 203 in the central bore 202 at the actuator port C2 to abut the poppet ring PR4 at other end and to a suitable support element, such as a shoulder, on the body 201 or the stem 203 at the other end. As a further example, one or more pre-loaded springs may be arranged around the stem 203 between the poppet rings PR2 and PR3 to exert an axial closing force on the poppet ring PR2 at one and on the poppet ring PR3 at the other end. However, it should be appreciated that a specific technique by which the closing forces are created is not essential to the basic invention.

In the closed centre position of the stem 203 illustrated in FIG. 2A, there is no axial net force F that would displace the stem 203 from the center position in the axial direction. All metering edges PR1/PS1, PR2/PS2, PR3/PS3 and PR4/PS4 are closed, i.e. each poppet ring PR1, PR2, PR3 and PR4 is pressed against its respective mating seat surface PS1, PS2, PS3 and PS4. There is no fluid flow between the ports EX1, C1, S, C2 and EX2. FIGS. 4A, 4B and 4C illustrate schematically an example of implementation of the flexible support SD3 for the poppet ring PR3 to the stem 203. The flexible support SD3 may be in form of a folded annular sealing diaphragm having an inner circle fixed to the outer periphery of the stem 203 and having an outer circle fixed to the inner circle of the poppet ring PR3. The mating seat surface PS3 is a fixed surface on the valve body 201. In the FIG. 4A, the U-shaped fold of the sealing diaphragm SD1 is approximately or nearly undeformed and the poppet ring PR3 rests against the mating seal surface PS3. It should be appreciated that the closed position of a metering edge may comprises a subrange of the total movement, for example 10 percentage of the total movement, and therefore the sealing diaphragm may be slightly deformed, i.e. approximately or nearly undeformed.

The axial net force F may be formed by an axial pilot force affecting on one end of the stem 203 and an axial counter force affecting on the opposite end of the stem 203. In an exemplary embodiment, the pilot force may be provided by a pilot fluid pressure affecting on a pilot diaphragm 206 and a piston 207 arranged at one end of the stem 203, as illustrated in FIGS. 3A and 3B. In an exemplary embodiment, the counter force may be provided by a counter fluid pressure affecting on a counter diaphragm 208 and a counter piston 209 arranged at the opposite end of the stem 203, as illustrated in FIGS. 3A and 3B. The counter pressure in a chamber 211 may be the supply pressure and the counter diaphragm may be employed to scale the counter force to be equal to force provided by the pilot pressure in the chamber 210 such that the axial net force F is about zero. The area of the counter diaphragm 208 will be smaller than that of the pilot diaphragm 206. The ratio of the diaphragm areas may be about from 0.5 to 0.95, for example, depending on the application. Deriving also the counter force from the supply pressure make both the counter force and the pilot force to scale with the supply pressure which may vary, thus, providing a supply pressure balanced construction.

Figure 3C:
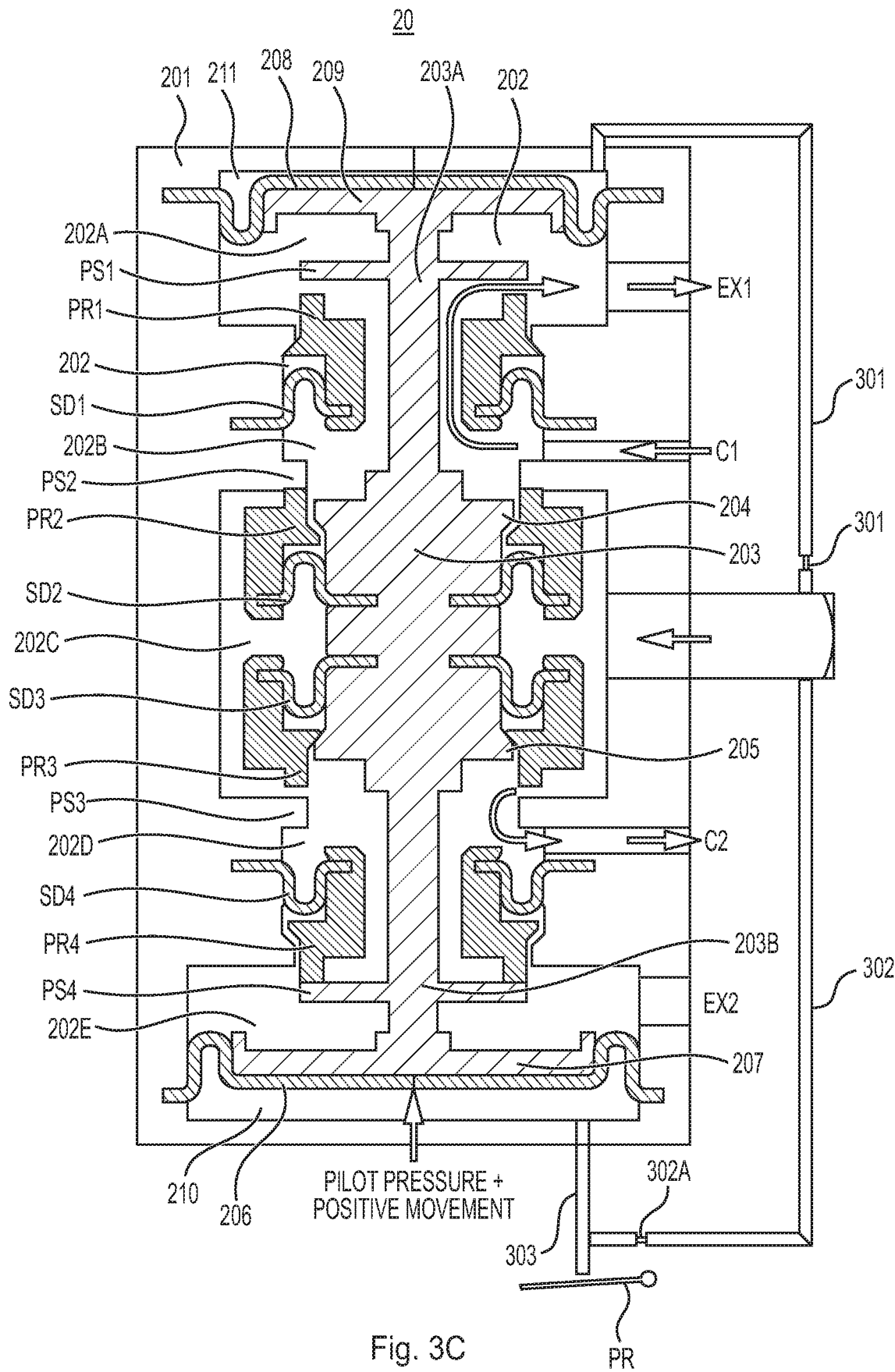
FIG. 3C illustrates schematically a fluid valve assembly with a pilot force and a counter force derived from the supply pressure.

In an embodiment, a prestage PR may be provided which controls a pilot pressure in the pilot pressure chamber 210 and thereby the axial pilot force, as schematically illustrated in FIG. 3C. The prestage PR may control the pilot pressure in the pilot pressure chamber 210 by, for example, controlling with a valve or flap which amount of the supply pressure air is shunted to the environment, and which amount of the air is directed to the pilot pressure chamber 210 via the pilot pressure inlet 303. The lowest pilot pressure may be obtained then the flap or valve is in its open position, which may correspond to a predetermined restriction orifice, such as 0.5 mm in diameter. Then a flap or valve is driven in closing direction, the restriction orifice becomes smaller and the pilot pressure raises, and finally the flap or valve is in its closed position with smallest or zero restriction orifice and the highest pilot pressure. Typically, the supply pressure supplied to the prestage PR may be restricted to prescale the supply pressure for a desired control range of the pilot pressure. The flow restriction for setting the control range may correspond to a 0.2 mm restrictor orifice, for example.

In dynamic situations where supply pressure fluid flows to the actuator chamber 202B or 202D from the supply chamber 202C through an opening measuring edge PR3/PS3 or PR3/PS3, respectively, the supply pressure may suddenly drop, which leads to a corresponding drop in the axial counter force and the axial pilot force with different delays. The pressure drop may be so sudden and short that it may affect only to the axial counter force, for example, thus resulting in increase in the axial net force (a net force peak). Increasing the net force would move the stem 203 upward, thereby opening the measuring edge more and further dropping the supply pressure SP. Also if a user raises the supply pressure at some point of time, the the axial counter force and the axial pilot force may reach their new values with different delays, also causing an undesired peak in the net force. Similarly, if the user decreases supply pressure over time, similar peak in the net force may be generated.

According to an aspect of the invention, effect of the fluctuation of a supply pressure on the axial counter force and the axial pilot force is stabilized and made equal. In exemplary embodiments of the invention, a restricted flow path, such a restricted flow path 301 illustrated in FIG. 3C, may be provided between the counter pressure chamber 211 and the supply chamber 202C (including a section of a supply pressure channel close to the actual outer chamber 202C). By means of the restricted flow path 301, sudden supply pressure fluctuations in the supply chamber 202C or the supply pressure are removed from the counter pressure chamber 211, while slower or permanent supply pressure changes in the supply chamber 202C will pass through to the counter pressure chamber 211.

In an embodiment, a restricted flow path 302 may be provided from the supply chamber 202C (including the supply pressure inlet close to the outer supply chamber 202C) to the prestage PR. The restricted flow path 302 may also implement the flow restriction of the supply pressure for setting the control range of the pilot pressure. By means of the restricted flow path 302 connected to the supply chamber 202C, fluctuation of a supply pressure at the prestage PR is stabilized. By means of the restricted flow path 203, sudden supply pressure fluctuations in the supply chamber 202C are damped or removed from the supply pressure at the prestage PR and from the pilot pressure retained in the which in the pilot pressure chamber 210, while slower or permanent supply pressure changes in the supply chamber 202C will pass through to the pilot pressure chamber 210. The restricted flow path 301 and the restricted flow path 302 may be dimensioned so that the change in the supply pressure in the supply chamber 202C will affect at substantially similar rates to the axial counter force through the pilot pressure chamber 211 and to the pilot force through the pilot pressure chamber 210, so that the change in the net force is zero or very small. Thus, the counter pressure in the counter pressure chamber 211 and the pilot pressure in the pilot pressure chamber can in a controlled and stable manner follow any fluctuation in the supply pressure in the supply chamber 202C, so that rapid uncontrolled movements or overshoots of the valve stem 203 can be avoided.

In some embodiments, the restricted flow paths 301 and 302 may comprise a narrower or smaller-diameter section 301A and 302A, respectively, referred to as a flow restrictor, such as a restriction orifice (RO), as illustrated in FIG. 3C. The area (i.e. the diameter) of the restriction orifice determines the rate of flow at the outlet of a given process fluid for the specified pressure and temperature. The restriction orifice is mainly used to achieve controlled or restricted flow of process medium. The orifice offers a restriction to the process flow and the pressure head drops from the upstream to the downstream. In exemplary embodiments, the restriction orifice 301A and 302A may preferably have an orifice diameter of from about 0.1 mm to about 0.5 mm, more preferably from about 0.2 mm to about 0.3 mm. It should be appreciated that the restriction orificies 301A and 302A typically may not be of the same size but their relative sizes may be dimensioned so that the that the change in the supply pressure in the supply chamber 202C will affect at substantially similar rates to the axial counter force through the pilot pressure chamber 211 and to the pilot force through the pilot pressure chamber 210, so that the change in the net force is zero or very small. Typically, the restriction path 302 may be dimensioned first to obtain the desired pilot pressure range, and the restriction path 301 may be dimensioned so as to stabilize the axial net force.

As another example, the axial counter force may be provided by an elastic preloaded element, such as a spring arranged to the opposite end of the stem 203. However, in this alternative the spring force is a mechanical force which does change with the supply pressure while the pilot pressure is derived from and dependent of the supply pressure. This limits the supply pressure range that can be used. In an embodiment, the pilot fluid pressure may derived from a supply fluid pressure regulated by a pressure regulator, to mitigate this problem.

In an embodiment, the area of the counter diaphragm 208 and the area of the pilot diaphragm 206 may be approximately equal to each other, and the counter fluid pressure may be pre-scaled.

In an embodiment, the area of the counter diaphragm 208 and the area of the pilot diaphragm 206 may be approximately equal to each other, and the counter fluid pressure may comprise a second pilot fluid pressure controlled by a prestage in a similar manner as first-mentioned the pilot fluid pressure is controlled. In such embodiment, in the case a failure of the supply pressure, the electric supply, the pilot pressure and/or the control signal, for example, the fluid valve assembly will assume the closed intermediate position, and the actuator will stay in the present position (Fail Freeze).

The axial net force F is zero when the axial pilot force and the axial counter force are equal, and the valve assembly is in a closed center position illustrated in FIG. 2A. The actuator does not move (for example, a control valve maintains its present opening). When the axial pilot force increases to be larger than the axial counter force, a positive axial net force F is created, and the stem 203 moves upwards (to a positive direction) as illustrated in FIGS. 2B, 3A and 4B. An engagement element 205, such as a shoulder, in the stem 203 engages to the poppet ring PR3 and moves it upwards thereby opening the third metering edge PR3/PS3, and the fluid flows from the supply port S to the actuator port C2. In the examples shown in FIGS. 3A and 4B, the U-shaped fold of the sealing diaphragm SD3 assumes or maintains approximately undeformed shape, because the poppet ring PR3 can move freely with the stem 203. At the same time the counter-acting metering edge PR4/PS4 is maintained closed as the upwards-moving seat surface PS4 of the stem 203 engages and moves upwards the poppet ring PR4, which is flexibly supported to the body 20. In the example shown in FIG. 3A, the U-shape of the sealing diaphragm SD4 is deformed to allow the movement of the poppet ring PR4 in relation to the body 201. Also the seat surface PS1 of the stem 203 moves upwards and is separated from the poppet ring PR1 thereby opening the first metering edge PR1/PS1, and the fluid flows from the actuator port C1 to the exhaust port EX1. In the examples shown in FIG. 3A, the U-shaped fold of the sealing diaphragm SD1 is approximately undeformed. At the same time, the poppet ring PR2, since it is flexibly supported to the stem 203, is maintained stationary against the mating seat surface PS2 on the body 201 while the stem 203 is moving upwards through the poppet ring PR2. Thus, the metering edge PR2/PS2 is maintained closed. In the example shown in FIG. 3A, the U-shape of the sealing diaphragm SD2 is deformed to allow the movement of the poppet ring PR2 relative to the stem 203. The actuator moves in a first direction (e.g. towards 100% opening of a control valve).

Starting from the position illustrated in FIGS. 2B, 3A and 4B, when the axial pilot force decreases to be equal to and then smaller than the axial counter force, the positive axial net force F is first decreased and then a negative axial net force F is created, and the stem 203 moves downwards (to a negative direction) as illustrated in FIGS. 2C, 3B and 4C. An engagement element 204, such as a shoulder, in the stem 203 engages to the poppet ring PR2 and moves it downwards thereby opening the second metering edge PR2/PS2, and the fluid flows from the supply port S to the actuator port C1. In the example shown in FIG. 3B, the U-shape of the sealing diaphragm SD2 is restored to the original, approximately undeformed shape to with the upward movement of the poppet ring PR2 relative to the stem 203. At the same time the counter-acting metering edge PR1/PS1 is closed when the poppet ring PR1, since it is flexibly supported to the body 201, is engaged by and moved downwards with downward-moving seat surface PS1 of the stem 203. In the example shown in FIG. 3B, the U-shape of the sealing diaphragm SD1 is deformed to allow the downward movement of the poppet ring PR1 relative to the body 201. Also the seat surface PS4 of the stem 203 moves downwards and is separated from the poppet ring PR4 thereby opening the fourth metering edge PR4/PS4, and the fluid flows from the actuator port C2 to the exhaust port EX2. In the example shown in FIG. 3B, the U-shape of the sealing diaphragm SD4 is restored to the original, approximately or nearly undeformed shape with the downward movement of the poppet ring PR4 relative to the body 201. At the same time, the poppet ring PR3, since it is flexibly supported to the stem 203, moves against the mating seat surface PS3 on the body 201 and stops there while the stem 203 is moving downwards. Thus, the metering edge PR3/PS3 is closed. In the examples shown in FIGS. 3B and 4C, the U-shape of the sealing diaphragm SD3 is deformed to allow the upward movement of the poppet ring PR3 relative to the stem 203. The actuator moves in a second direction (e.g. towards 0% opening of a control valve).

According to an aspect of the invention, the poppet rings PR1, PR2, PR3 and PR4 may be pressured-balanced. A pressure-balanced poppet ring may be dimensioned and shaped such that the fluid pressure forces exerted on the poppet ring are compensated to make the resultant fluid pressure force affecting on the respective metering edge 501 very small or zero. As a result, the control forces required to move the stem are only fraction of the control forces required in unbalanced poppet valve assemblies. This provides a possibility to control the stem 203 faster than in the prior art poppet valves (resulting in a better control) or with a smaller pilot pressure (resulting in a lower energy need of a controller). The compensation of the fluid pressure forces results also in a linear operation of the stem 203 over a control range. In the prior art solutions the uncompensated high fluid pressure forces induce a significant discontinuation point (a large dead zone) exactly in the middle of the control range. Therefore, the pressure-balanced poppet rings result in a significantly better controllability of a poppet valve assembly according to an exemplary embodiment in comparison with the prior art poppet valve assemblies. This allows employing a high-capacity output stage also for controlling small actuators without a loss in the control accuracy of a process valve.

The poppet rings PR1, PR2, PR3 and PR4 are examples of pressure-balanced poppet-rings. Another example of a pressure-balanced poppet ring is illustrated in FIG. 5A. The exemplary poppet ring is illustrated when used in place of pressure-balanced poppet ring PR3, but similar poppet ring can be used in place of any of the poppet rings shown in FIGS. 2A, 2B, 2C, 3A, 3B, 4A, 4B and 4C. In FIG. 5A the metering edge PR3/PS3 is shown in a closed position. The poppet ring PR3 is on the high pressure side (the supply pressure) in the middle chamber 202C. The flexible sealing diaphragm SD3 may provide an air-tight sealing between the poppet ring PR3 and the stem 203, fixes the poppet ring PR3 to the stem 203 while allowing an axial relative movement of the poppet ring PR3 and the stem 203. The geometry of the poppet ring PR3 may be such that the effective metering edge PR3/PS3 is formed at a ring tip 501 that is relatively narrow in the radial direction. The middle point of the fold in the sealing diaphragm SD3 may be approximately aligned with the ring tip 501 in the axial direction (the vertical direction in FIG. 5A). At the opposite end of the poppet ring PR3 (the upper end in FIG. 5A) the radial width from the middle point of the fold of the sealing diaphragm SD3 outwards may define a predetermined upper surface area that determines the axial (downwards) pressure force exerted to the poppet ring PR3 subjected to the axial (downwards) pressure force due to the supply pressure. The geometry of the poppet ring PR3 may be selected so that the high pressure side is extended below the poppet ring up to the ring tip 501, as illustrated by a high pressure chamber 202G. The bottom surface 503 facing to the chamber 202 may be dimensioned so that the supply pressure affecting on the bottom surface of the poppet ring PR3 will provide a compensating axial (upward) pressure force which is approximately equal to the downward pressure force. Thereby the resultant pressure force affecting on the poppet ring PR3 is very small or zero. On the low pressure side the low pressure may be present in a space 202F under the flexible diaphragm SD4 and above a radially inward-extending shoulder 504 of the poppet ring PR3. The dimensions of the shoulder 504 may be such that the downward pressure force caused by the low pressure fluid on the upper surface of the shoulder 504 will approximately compensate the upward pressure force caused by the low fluid pressure under the poppet ring PR3. Element 502 is an example of fixing the flexible sealing diaphragm SD3 to the poppet ring PR3. FIG. 5B illustrates an example of using similar poppet ring in place of the poppet ring PR1 which is flexibly connected to the body 201. The profile of PR1 the may be a mirror image of that of shown in FIG. 5A. Further, the installation of the ring PR1 is rotated vertically in a similar manner as in FIGS. 3A and 3B. FIG. 5C illustrates a further example profile of a poppet ring (PR3 is shown as an example). FIG. 5D illustrates a further example profile of a poppet ring (PR1 is shown as an example). Each of the ring profiles can be rotated vertically or horizontally for in place of other poppet rings PR1, PR2, PR3 and PR4 shown in FIGS. 2A, 2B, 2C, 3A, 3B, 4A, 4B and 4C. There may also be two or more different profiles of the poppet rings in a same valve assembly 20. For example, the poppet rings PR1 and PR4 may have a profile according to FIG. 5D and the poppet rings PR2 and PR3 may have a profile according to FIG. 5C.

For a single-acting actuator only one actuator port is required, and only two metering edges are needed: one for controlling a fluid flow from a fluid pressure supply port S to the actuator port and another one for controlling fluid flow from the actuator port to an exhaust port. The fluid valve assembly 20 for a double acting actuator can be used also for a single-acting actuator by using only one of the actuator ports C1 and C2, and by blocking the other one.

Figure 6:
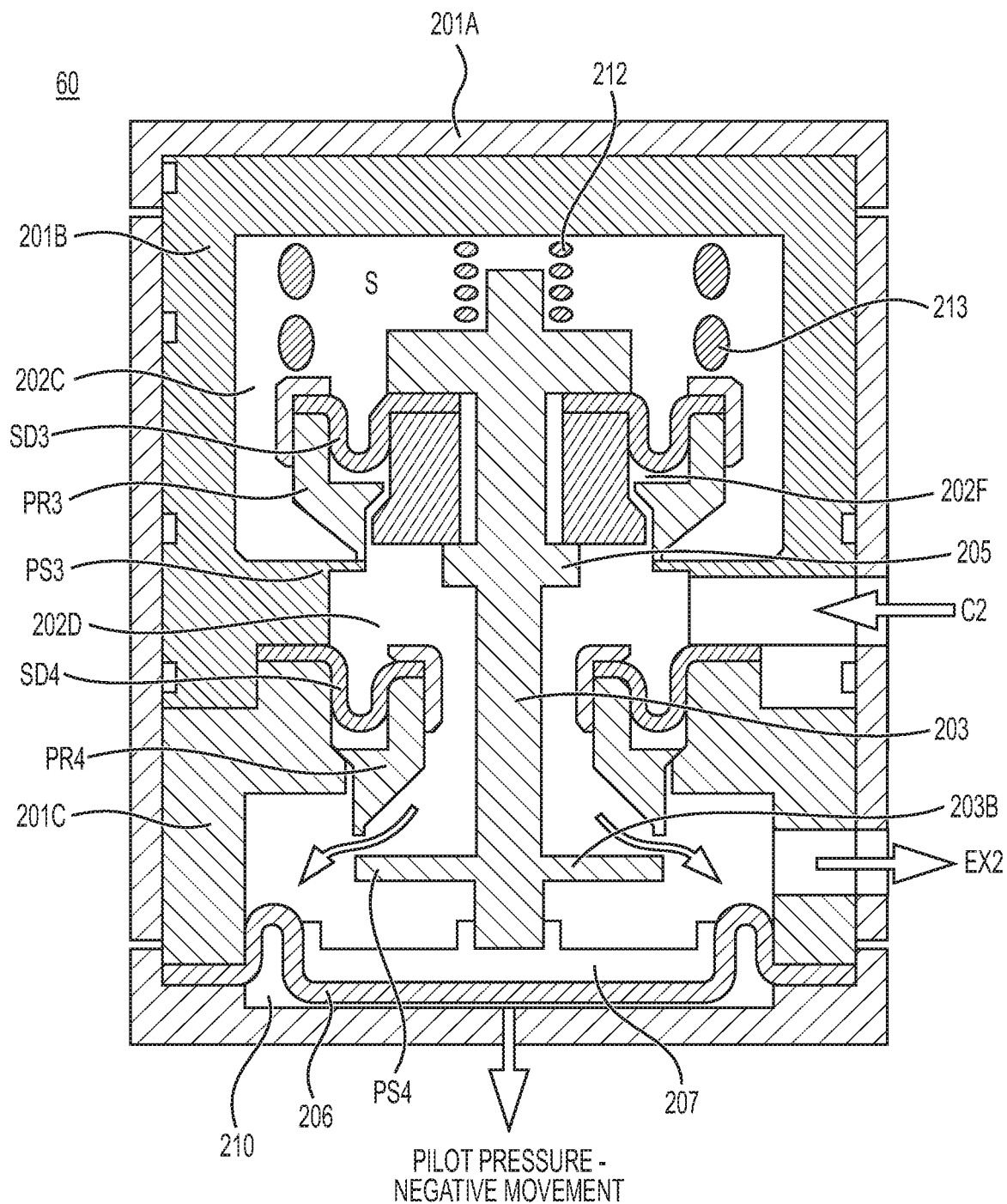
FIG. 6 illustrates schematically a fluid valve assembly according to further exemplary embodiments for controlling a single-acting actuator.

In FIG. 6, a fluid valve assembly 60 according to further exemplary embodiments for controlling a single-acting actuator or a corresponding device is illustrated schematically. The valve assembly 60 may be a simplified version of the valve assembly 20, and same principles can be applied as described herein in connection with the fluid valve assembly 20 for a double acting actuator. Same reference symbols in FIG. 6 and in FIGS. 2A-2C, 3A-3B, 4A-4C, 5A-5D refer to the same or corresponding elements, structures, functionalities and features.

In the exemplary embodiment shown in FIG. 6, the valve assembly 60 is a 3/3 valve with three ports and three positions or states. The valve assembly 60 is a simplified version of the valve assembly 20 described above; it is basically a bottom half of valve assembly 20. However, similarly the metering edges in top half or a middle section of the valve assembly 20 could be used to provide the valve assembly 60. As a further alternative, the top and bottom metering edges may be used, while the metering edges in the middle section are omitted. The valve assembly 60 comprises an elongated frame or body 201 having an axial central bore or chamber 202 with a supply port S for receiving a supply of fluid under pressure, an actuator port C2 for providing a control fluid pressure to the single-acting actuator, and an exhaust port EX2 for venting (e.g. to environment) the fluid pressure from the actuator port C2. The valve assembly 60 may comprise one pair of counter-acting one pair metering edges PR3/PS3 and PR4/PS4 tied mechanically together by the stem 203 such that both metering edges of the counter-acting pair are closed in a centre position of the stem 203, one metering edge is closed and the other metering edge of the counter-acting pair is opened with the movement of the stem 203 to a first axial direction, and the one metering edge is opened and the other metering edge of the counter-acting pair is closed with the movement of the stem 203 to an opposite second axial direction. According to an aspect of the invention, metering edges PR3/PS3 and PR4/PS4 of the valve assembly 60 are mechanically tied together by the stem 203 and supported by flexible elements SD3 and SD4, so that the metering edges can continue movement in the direction of the stem 203 also upon they have reached their closed positions. In embodiment of the invention, the poppet rings PR3 and PR4 are pressured-balanced. In an exemplary embodiment, the pilot force may be provided by a pilot fluid pressure affecting on a pilot diaphragm 206 and a piston 207 arranged at one end of the stem 203. In an exemplary embodiment, the sealing diaphragm SD3 may also function as a counter force diaphragm to provide an axial counter force for the pilot force. An elastic preloaded element 212, such as a spring arranged to the opposite end of the stem 203, may be provided to to drive the valve to a safe position in the case of a failure, e.g. when the supply pressure or the electric power is lost. Further, one or more pre-loaded springs 213 may be arranged around the stem 203 between the top of body 201 and the poppet ring PR3 to exert an axial closing force on the poppet ring PR3. As a further example, there may be one or more pre-loaded springs around the stem 203 in the central bore 202 at the actuator port C2 to abut the poppet ring PR4 at other end and to abut a suitable support element, such as a shoulder, on the body 201 or the stem 203 at the other end. In the example shown in FIG. 6, the body 201 may comprise a plurality of separated parts, such as 201A, 201B and 201C, assembled to form the body 201. Such approach may make it easier to manufacture and assemble the fluid valve.

It should also be appreciated that all embodiments discussed in connection with the fluid valve assembly 20 for a double-acting actuator can also be applied in the fluid valve assembly 60 for a single-acting actuator and vice versa.

Embodiments of the invention can be applied in control of any fluid-pressure operated actuators. Embodiments of the invention are particularly applicable in control of actuators of process devices, such as control valves, shut-off valves, screens, etc., in any automation system for any industrial process and the like.

Figure 7:
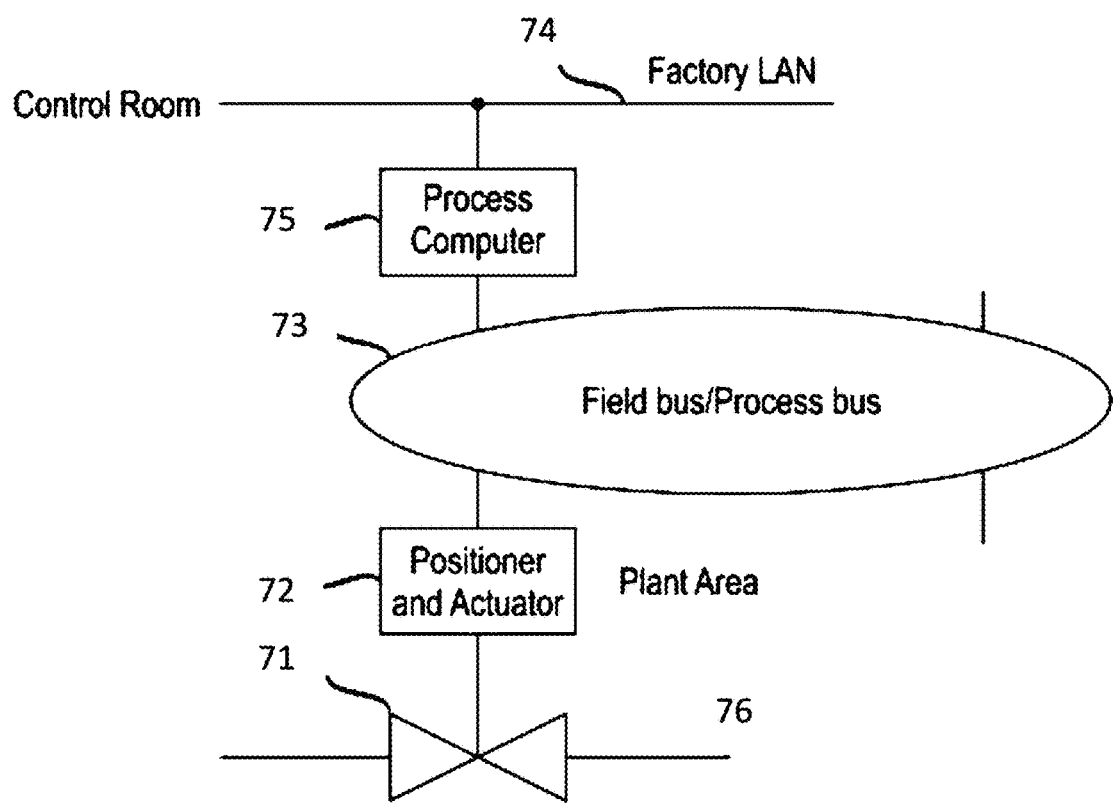
FIG. 7 illustrates a schematic block diagram of an exemplary process automation system.

FIG. 7 shows a schematic block diaphragm of an exemplary process automation system wherein the principles of the invention may be applied in a valve positioner. The control system block 75 generally represents any and all control room computer(s)/programs and process control computer(s)/programs as well as databases, which may be interconnected by a factory LAN 74, in the automation system. There are various architectures for a control system. For example, the control system may be a Direct Digital Control (DDC) system or Distributed Control System (DCS), both well known in the art.

In the example of FIG. 7, only one controlled process valve is shown, but an automation system may, however, include any number of field devices, such as control valves, often hundreds of them. There are various alternative ways to arrange the interconnection between the control system and field devices, such as control valves, in a plant area. In FIG. 7, the field/process bus 73 generally represents any such interconnection. Traditionally, field devices have been connected to the control system by two-wire twisted pair loops, each device being connected to the control system by a single twisted pair providing a 4 to 20 mA analog input signal. More recently, new solutions, such as Highway Addressable Remote Transducer (HART) protocol, that allow the transmission of digital data together with the conventional 4 to 20 mA analog signal in the twisted pair loop have been used in the control systems. The HART protocol is described in greater detail for example in the publication HART Field Communication Protocol: An Introduction for Users and Manufacturers, HART Communication Foundation, 1995. The HART protocol has also been developed into an industrial standard. Examples of other fieldbuses include Foundation Fieldbus and Profibus PA. However, it is to be understood that the type or implementation of the field/process bus 73 is not relevant to the present invention. The field/process bus 73 may be based on any one of the alternatives described above, or on any combination of the same, or on any other implementation.

A process valve 71 and a positioner/actuator 72 may be connected to a process to control the flow of a substance in process pipeline 76. The material flow may contain any fluid material, such as fluids, liquors, liquids, gases and steam.

Figure 8:
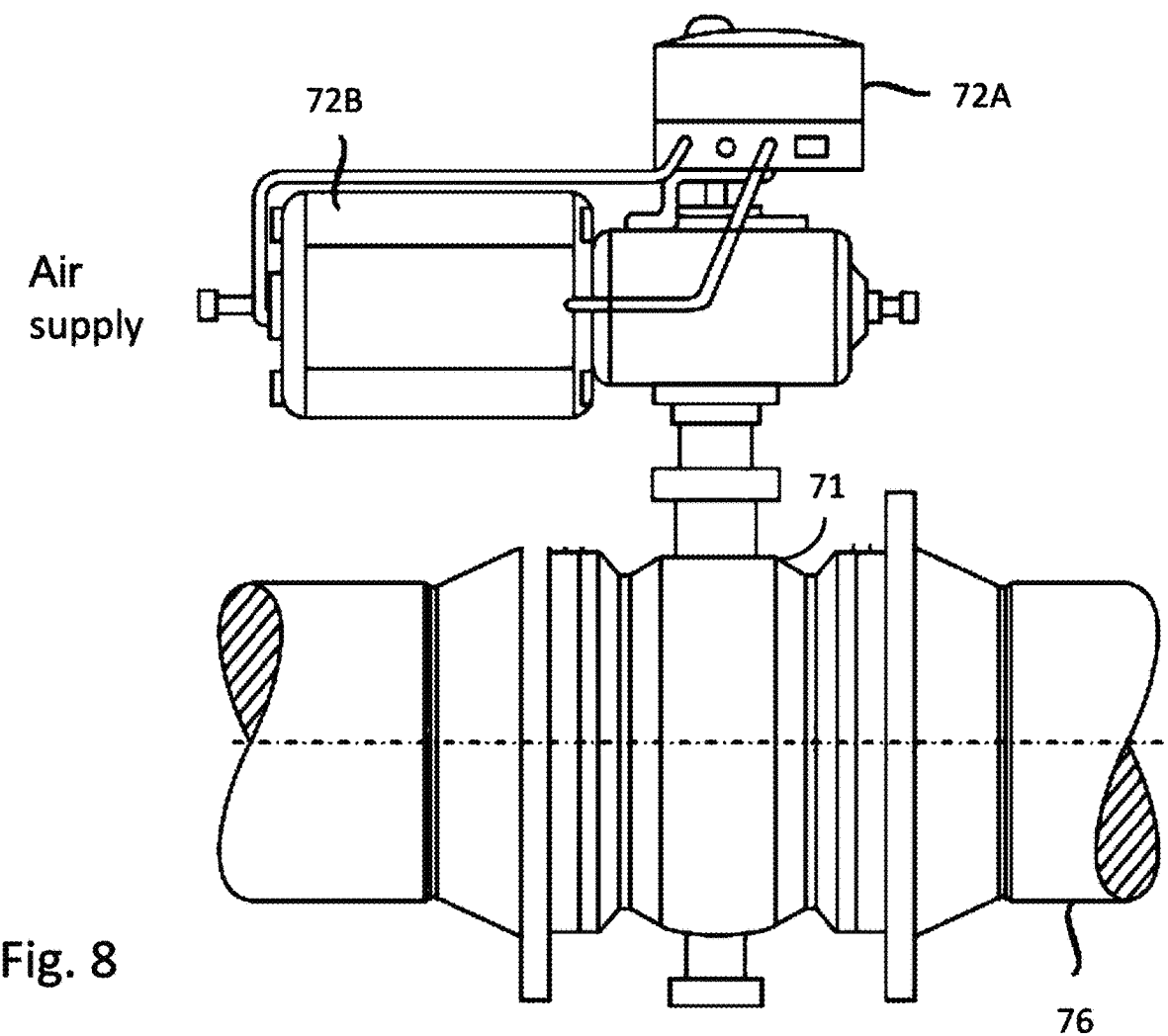
FIG. 8 illustrates an exemplary arrangement wherein a pneumatic actuator operates the process valve under control of the valve positioner.

FIG. 8 illustrates an exemplary arrangement wherein a pneumatic actuator 72B operates the process valve 71 under control of the valve positioner 72A. An example of a process valve 71 is Neles® RotaryGlobe control valve from Metso Corp. An example of a valve positioner 72A wherein embodiments of the invention may be applied is Neles® ND9000 intelligent valve controller from Metso Corp. An example of an actuator 72B is Quadra-Powr X series pneumatic actuator from Metso Corp.

The operation of an intelligent valve controller, such as valve controller 72A, may be based on a microcontroller, such as a microprocessor (µP), which controls the position of the valve on the basis of control information obtained from the field connection line or fieldbus 73. The valve controller is preferably provided with valve position measurement, in addition to which it is possible to measure many other variables, such as supply pressure for pressurized air, pressure difference over actuator piston or temperature, which may be necessary in the self-diagnostics of the valve or which the valve controller transmits as such or as processed diagnostic information to the control room computer, process controller, condition monitoring computer or a similar higher-level unit of the automation system via a field bus.

Figure 9:
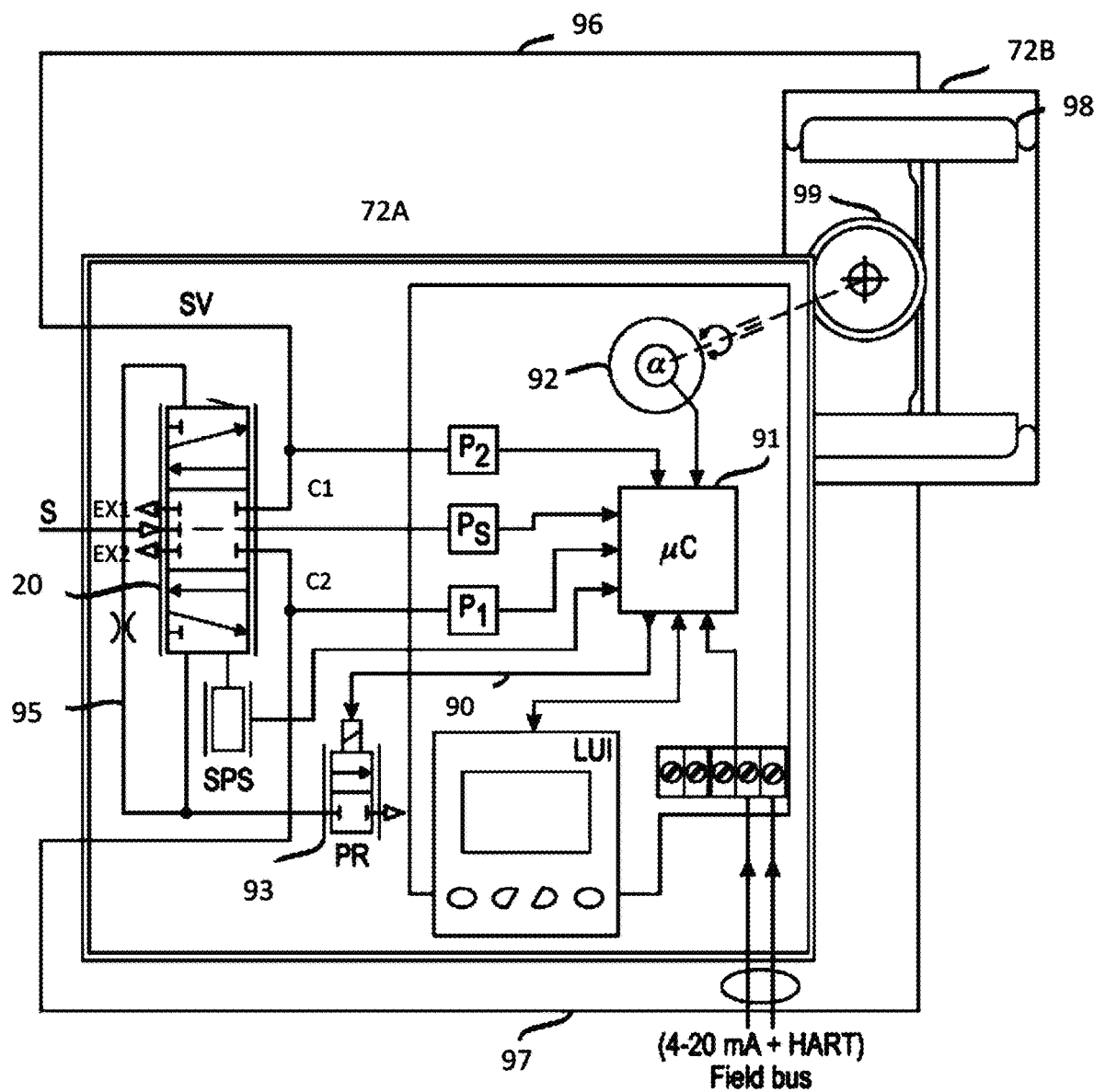
FIG. 9 shows a schematic block diagram of an exemplary intelligent valve controller wherein a fluid valve assembly according to embodiments of the invention may be applied.

An example block diagram of microcontroller-based intelligent valve controller, such as valve controller 72A, is illustrated in FIG. 9. A controller may include an electronic unit 91 having an electrical control output 90 and a pneumatic unit 20, 93 that takes in the electrical control signal 90 and converts it to a corresponding fluid pressure output P1,P2 at actuator ports C1, C2 connected to an actuator 72B. The pneumatic unit may comprise a prestage 93 and an output stage 20. The output stage 20 may be any fluid valve assembly 20 for a double-acting actuator according to embodiments of the invention. The prestage 93 performs an electric-to-pressure (I/P) conversion of the electrical control signal 90 into a small pilot pneumatic control signal 95 which is sufficient to control the output stage 20. The supply port S of the output stage 20 is connected to a supply air pressure. The output stage 20 amplifies the small pneumatic pilot signal into a larger pneumatic pressure output signals 96,97 at the actuator ports C1,C2. The device may contain a Local User Interface (LUI) enabling local configuration. A microcontroller 11 controls the valve position. To that end, the microcontroller 91 may receive an input signal (a set point) over a process/fieldbus 93, such as 4-20 mA pair and HART, and may perform various measurements. The device may be powered from a 4-20 mA or fieldbus. The microcontroller 91 may read the input signal and a valve position sensor 92. The microcontroller may also read one or more of a supply pressure sensor Ps, a first actuator pressure sensor P1, a second actuator pressure sensor P2, and an output stage position sensor SPS. A difference between the set point defined by the input signal and the position measured by the position sensor 92 may be detected by means of a control algorithm inside the microcontroller 91. The microcontroller 91 calculates a new value for prestage (PR) coil current 90 based on the information from the input signal and from the sensor(s). Changed current 90 to the PR changes the pilot pressure 95 to the output stage 20. The pilot pressure 95 moves the stem 203 of the output stage and the actuator pressures at the actuator ports C1 and C2 change accordingly, as described with regard to embodiments of the invention above. When the pilot pressure 95 is at a predetermined value, the stem 203 is centered and all flow channels through the metering edges (poppet rings) are closed, the actuator 72B stays in place. When the pilot pressure 95 rises from the predetermined value, the stem 202 moves in the positive direction and air flows from the supply port S to the actuator port C2 and further therefrom to one side (lower side) of a double diaphragm actuator 72B, the opposite side of the double diaphragm actuator 72B being vented through the actuator port C1 to the exhaust port X1. The actuator moves in fully open (100%) direction. More specifically, the increasing pressure will move the diaphragm piston 98 upwards. The actuator and feedback shaft 99 rotate. The position sensor 92 measures the rotation for the microcontroller 91. The microcontroller 91 modulates the PR-current 90 from the steady state value until a new position of the actuator 90 according to the input signal is reached. The movement (travel) of the control valve in the opposite direction is obtained by causing the stem 203 move to the opposite direction (downwards, in the 0% direction) by decreasing the pilot pressure 95, so that the actuator port C2 is connected to the exhaust port EX2 and the actuator port C1 is connected to the pneumatic supply port S. It should be appreciated that the illustrated valve controller is merely an example and the invention is not limited any specific implementation of a valve controller.

Similarly, a valve controller for single-acting actuator can be implemented by using the 3/2 valve assembly 60 according to embodiments of the invention in place of the 5/3 valve assembly 20 and removing unnecessary structures and functionalities.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims

The invention claimed is:

1. A fluid valve assembly of a process valve positioner for connection to a supply of fluid under pressure for providing a hydraulic or pneumatic actuator with an actuator fluid pressure, the process valve positioner including an electronic unit having an electrical control output, and a pneumatic or hydraulic actuator having a prestage and an output stage, where the prestage converts the electrical control output into a pilot fluid pressure to control the output stage, the output stage including the fluid valve assembly, the fluid valve assembly comprising:
 a valve body having a central bore with (i) at least one supply port configured to receive the supply of fluid under pressure, (ii) at least one actuator port configured to provide the actuator fluid pressure to the hydraulic or pneumatic actuator, and (iii) at least one exhaust port;
 a stem movable within the central bore in an axial direction by an axial pilot force;
 a pilot diaphragm and a piston arranged at one end of the stem to provide the axial pilot force according the pilot fluid pressure that is applied to the pilot diaphragm in a pilot pressure chamber;
 a counter diaphragm and a counter piston arranged at an opposite end of the stem as the pilot diaphragm and the piston, the counter diaphragm and the counter piston being configured to provide an axial counter force according to a counter pressure applied to the counter diaphragm in a counter pressure chamber;
 at least one pair of counter-acting metering edges operationally linked by the stem, each metering edge of each counter-acting pair including (i) a mating seat surface on the valve body or the stem, and (ii) a poppet ring supported by a flexible element to the valve body or the stem in a manner allowing a relative axial movement of the poppet ring and the supporting valve body or stem in a closed state of the respective metering edge, each poppet ring being pressure-balanced to compensate fluid pressure forces exerted on the respective poppet ring so as to provide a very small or zero resultant fluid pressure force applied to the respective metering edge;
 a first restricted flow path from a supply pressure inlet of the valve assembly to the prestage, which controls the pilot pressure in the pilot pressure chamber and the axial pilot force; and
 a second restricted flow path from the supply pressure inlet of the valve assembly to the counter pressure chamber.

2. The fluid valve assembly as claimed in claim 1, wherein:
 the at least one pair of counter-acting metering edges are mechanically linked by the stem such that both metering edges of each counter-acting pair are closed in an intermediate position of the stem, and
 one metering edge is closed and the other metering edge of each counter-acting pair is opened based on movement of the stem to a first axial position, and the one metering edge is opened and the other metering edge of each counter-acting pair is closed based on the movement of the stem to an opposite second axial position.

3. The fluid valve assembly as claimed in claim 1, wherein one metering edge of each pair of counter-acting metering edges is configured to control fluid flow between a respective actuator port and the supply of fluid, and another metering edge of each pair of counter-acting metering edges is configured to control fluid flow between the respective actuator port and an exhaust port.

4. The fluid valve assembly as claimed in claim 1, wherein:
 one metering edge of each counter-acting metering edges includes the poppet ring supported by the flexible element to the stem and the respective mating seat surface on the valve body, and
 another metering edge of each pair of counter-acting metering edges includes the poppet ring supported by the flexible element to the valve body and the respective mating seat surface on the stem.

5. The fluid valve assembly as claimed in claim 1, wherein:
 each poppet ring is arranged coaxially with the stem, and
 the flexible element of each poppet ring includes a respective annular sealing element.

6. The fluid valve assembly as claimed in claim 5, wherein:
 in one metering edge of each pair of counter-acting metering edges, the poppet ring is supported at an inner circle of the poppet ring by the respective annular flexible sealing element to an outer circle of the stem, and
 in another metering edge of each pair of counter-acting metering edges, the poppet ring is supported at an outer circle of the poppet ring by the respective annular flexible sealing element to the valve body.

7. The fluid valve assembly as claimed in claim 1, wherein the at least one pair of counter-acting metering edges includes one pair of counter-acting metering edges at each actuator port of the fluid valve assembly, the actuator port being located between the counter-acting metering edges of the respective pair of counter-acting metering edges.

8. A double-acting actuator including the fluid valve assembly as claimed in claim 1, wherein:
   the at least one actuator port includes a first actuator port and a second actuator port, and
   the at least one pair of counter-acting metering edges includes a first pair of counter-acting first and second metering edges set to the first actuator port, and a second pair of counter-acting third and fourth metering edges set to the second actuator.

9. The fluid valve assembly as claimed in claim 8, wherein:
   the first actuator port is located between the first metering edge and the second metering edge of the first pair of counter-acting first and second metering edges, and
   the second actuator port is located between the third metering edge and the fourth metering edge of the second pair of counter-acting third and fourth metering edges.

10. The fluid valve assembly as claimed in claim 8, wherein:
    the first metering edge includes a first poppet ring arranged coaxially around the stem within the central bore and fixed to the valve body by a first flexible sealing element member allowing movement of the first poppet ring in the axial direction, the first poppet ring cooperating with a first mating seat surface on the stem to control fluid flow between the first actuator port and one of the supply port and the exhaust port;
    the second metering edge includes a second poppet ring arranged coaxially around the stem within the central bore and connected to the stem by a second flexible sealing member allowing movement of the second poppet ring in the axial direction, the second poppet ring cooperating with a second mating seat surface on the valve body to control fluid flow between the second actuator port and the other of the supply port and the exhaust port;
    the third metering edge includes a third poppet ring arranged coaxially around the stem within the central bore and fixed to the stem by a third flexible sealing element member allowing movement of the third poppet ring in the axial direction, the third poppet ring cooperating with a third mating seat surface on the valve body to control fluid flow between the second actuator port and one of the supply port and the exhaust port; and
    the fourth metering edge includes a fourth poppet ring arranged coaxially around the stem within the central bore and connected to the valve body by a fourth flexible sealing member allowing movement of the fourth poppet ring in the axial direction, the fourth poppet ring cooperating with a fourth mating seat surface on the stem to control fluid flow between the second actuator port and the other of the supply port and the exhaust port.

11. The fluid valve assembly according to claim 10, wherein:
    the at least one supply port includes a common supply port located at a middle section of the central bore defined between the second pair of counter-acting third and fourth metering edges, and
    the at least one exhaust port includes a first exhaust port located at a first end section of the central bore defined between the first metering edge and a first end of the central bore, and a second exhaust port located at an opposite second end section of the central bore defined between the fourth metering edge and an opposite second end of the central bore.

12. The fluid valve assembly as claimed in claim 1, wherein the first restricted flow path and the second restricted flow path have dimensions such that a rate of change of the axial counter force and a rate of change of the pilot force due to a change in the supply pressure in the supply pressure inlet are equal.

13. The fluid valve assembly as claimed in claim 1, wherein the first restricted flow path or the second restricted flow path includes a flow orifice restrictor.

14. The fluid valve assembly as claimed in claim 13, wherein the flow orifice restrictor includes an orifice diameter of from 0.1 mm to 0.5 mm.

15. The fluid valve assembly as claimed in claim 13, wherein the flow orifice restrictor includes an orifice diameter of from about 0.2 mm to 0.3 mm.

16. The fluid valve assembly as claimed in claim 1, wherein all metering edges are aligned in the axial direction.

17. The fluid valve assembly as claimed in claim 1, wherein the counter diaphragm is arranged to scale the axial counter force from the supply fluid force applied to the counter diaphragm.

* * * * *